(12) United States Patent
Hoshino

(10) Patent No.: US 12,427,829 B2
(45) Date of Patent: Sep. 30, 2025

(54) TEMPERATURE CONTROL SYSTEM

(71) Applicant: TOYOTA JIDOSHA KABUSHIKI KAISHA, Aichi-ken (JP)

(72) Inventor: Yu Hoshino, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 243 days.

(21) Appl. No.: 18/167,899

(22) Filed: Feb. 13, 2023

(65) Prior Publication Data

US 2023/0256793 A1    Aug. 17, 2023

(30) Foreign Application Priority Data

Feb. 15, 2022 (JP) ................................. 2022-021580

(51) Int. Cl.
| | |
|---|---|
| *B60H 1/00* | (2006.01) |
| *B60L 58/27* | (2019.01) |
| *H01M 10/615* | (2014.01) |
| *H01M 10/625* | (2014.01) |
| *H01M 10/663* | (2014.01) |

(52) U.S. Cl.
CPC .......... *B60H 1/00385* (2013.01); *B60L 58/27* (2019.02); *H01M 10/615* (2015.04); *H01M 10/625* (2015.04); *H01M 10/663* (2015.04); *B60H 2001/00307* (2013.01)

(58) Field of Classification Search
CPC .. B60H 1/00; B60H 1/00385; B60H 1/00314; B60H 2240/34; B60H 2001/00307; B60H 1/00885; B60H 1/143; B60H 1/00278; H01M 10/625; H01M 10/615; H01M 10/663; H01M 10/635; H01M 10/486; H01M 10/63; H01M 10/633; B60L 1/003; B60L 58/27; B60L 1/02; B60L 2240/34
See application file for complete search history.

(56) References Cited

U.S. PATENT DOCUMENTS

| | | |
|---|---|---|
| 2013/0280561 A1 | 10/2013 | Tolkacz et al. |
| 2020/0101815 A1 | 4/2020 | Kurasawa et al. |
| 2021/0190389 A1* | 6/2021 | Tada ........................ B60H 1/22 |

FOREIGN PATENT DOCUMENTS

| | | |
|---|---|---|
| CN | 113352839 A | 9/2021 |
| DE | 102013206651 A1 | 10/2013 |
| JP | 202055342 A | 4/2020 |

\* cited by examiner

*Primary Examiner* — Harry E Arant
(74) *Attorney, Agent, or Firm* — HAUPTMAN HAM, LLP

(57) ABSTRACT

A temperature control system includes an air-conditioning circuit, a battery temperature adjustment circuit, a heat exchanger, a thermometer, and a controller. The air-conditioning circuit includes a heating unit for heating the air-conditioning heating medium and an air-conditioning flow amount adjustment unit for adjusting the amount of flow of the air-conditioning heating medium. The battery temperature adjustment circuit includes a battery flow amount adjustment unit for adjusting the amount of flow of the battery heating medium. The controller variably controls the amount of flow of at least one of the air-conditioning heating medium and the battery heating medium, depending on a request for increasing the temperature of the battery, a request for heating the cabin of the vehicle, and the temperature of the battery.

9 Claims, 3 Drawing Sheets

TEMPERATURE CONTROL SYSTEM

CROSS REFERENCE TO RELATED APPLICATION

This application claims priority to Japanese Patent Application No. 2022-21580 filed on Feb. 15, 2022, which is incorporated herein by reference in its entirety including the specification, claims, drawings, and abstract.

TECHNICAL FIELD

The present disclosure relates to a temperature control system for both heating a battery and heating the cabin of a vehicle.

BACKGROUND

JP2020-55342A discloses a heat management system of a vehicle, including a refrigerant circuit for circulating a refrigerant for adjustment of the temperature in the cabin of the vehicle, a heating circuit for circulating a liquid for heat exchange with respect to the refrigerant to adjust the temperature of the cabin of the vehicle, and a battery temperature adjustment circuit for introducing the liquid for heat exchange with respect to the refrigerant into a high voltage battery to adjust the temperature of the high voltage battery. The heating circuit includes a high voltage heater for heating the circulating liquid.

Thus, this heat management system can heat the cabin of the vehicle and increase the temperature of the high voltage battery, using the high voltage heater.

SUMMARY

JP2020-55342A discloses that the cabin of the vehicle is heated utilizing the liquid having been heated by the high voltage heater, and that the liquid is introduced into the battery temperature adjustment circuit to increase the temperature of the high voltage battery. In order to utilize the heat from the high voltage heater in both increasing the temperature of the battery and heating the cabin of the vehicle, the heat needs to be appropriately allocated between heating the battery and heating the cabin, depending on the situation. This allocation, however, is not taken into consideration in JP2020-55342A.

According to one aspect of the present disclosure, there is provided a temperature control system including an air-conditioning circuit for circulating an air-conditioning heating medium and for adjusting the temperature of the cabin of a vehicle through heat exchange between the air-conditioning heating medium and the air in the cabin; a battery temperature adjustment circuit for circulating a battery heating medium and for adjusting the temperature of the battery through heat exchange between the battery heating medium and the battery; a heat exchanger for exchanging heat between the air-conditioning heating medium and the battery heating medium; a thermometer for measuring the temperature of the battery; and a control unit for controlling the air-conditioning circuit and the battery temperature adjustment circuit, wherein the air-conditioning circuit includes a heating unit for heating the air-conditioning heating medium, and an air-conditioning flow amount adjustment unit for adjusting the amount of flow of the air-conditioning heating medium, the battery temperature adjustment circuit includes a battery flow amount adjustment unit for adjusting the amount of flow of the battery heating medium, and the control unit variably controls the amount of flow of at least one of the air-conditioning heating medium and the battery heating medium, depending on a request for increasing the temperature of the battery, a request for heating the cabin of the vehicle, and the temperature of the battery.

In one embodiment, the control unit may variably control the amount of flow of the battery heating medium, depending on the request for increasing the temperature of the battery, the request for heating the cabin of the vehicle, and the temperature of the battery.

In one embodiment, the request for increasing the temperature of the battery may be a request that is made to fast-charge the battery.

According to the present disclosure, it is possible to appropriately allocate the heat to be used between increasing the temperature of a battery and heating the cabin of the vehicle through variable control of the amount of flow of a heating medium for a battery, based on a request for increasing the temperature of the battery, a request for heating the cabin of the vehicle, and the temperature of the battery.

BRIEF DESCRIPTION OF DRAWINGS

Embodiment(s) of the present disclosure will be described based on the following figures, wherein.

DESCRIPTION OF EMBODIMENTS

An embodiment of the present disclosure will now be described based on the accompanying drawings. Note that the present disclosure is not limited to the embodiment described here.

System Structure

Figure 1:
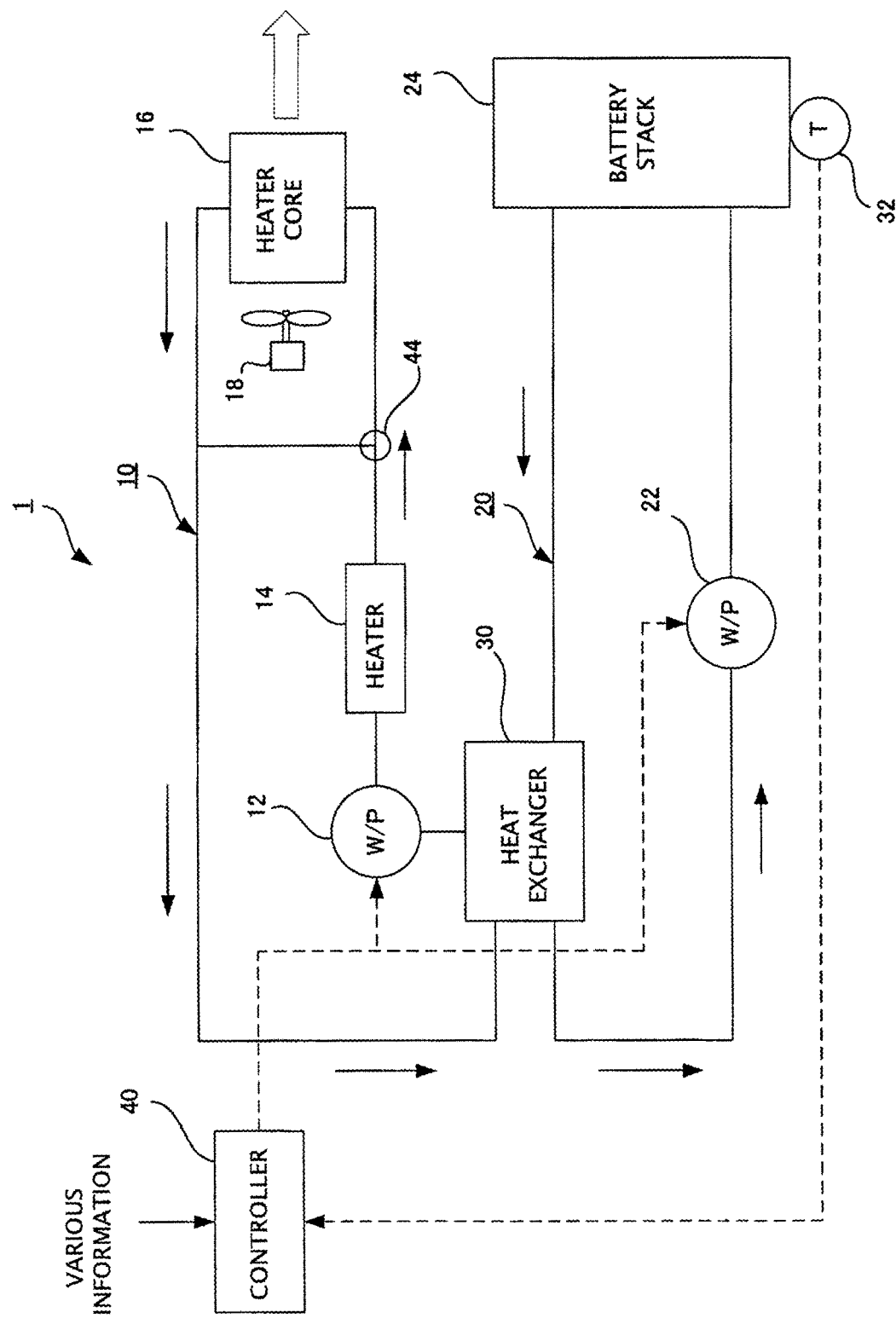
FIG. 1 is a block diagram illustrating the system structure of a temperature control system according to an embodiment.

FIG. 1 is a block diagram illustrating the system structure of a temperature control system according to an embodiment. Note that this system is assumed to be mounted in a vehicle.

The temperature control system 1 includes an air-conditioning circuit 10, a battery temperature adjustment circuit 20, and a heat exchanger 30. The heat exchanger 30 exchanges heat between the air-conditioning circuit 10 and the battery temperature adjustment circuit 20.

The air-conditioning circuit 10 is a circuit for circulating an air-conditioning heating medium, and includes a water pump (WP) 12, a heater 14, and a heater core 16. The water pump 12 discharges the air-conditioning heating medium, which is then heated by the heater 14 so that the temperature of the air-conditioning heating medium increases. The air-conditioning heating medium at increased temperature passes through the heater core 16, where the air-conditioning heating medium is subjected to heat exchange with the air in the cabin of the vehicle (hereinafter referred to as a cabin) so that the temperature of the air in the cabin increases. Note that the heater 14 will be hereinafter referred to as a heating unit.

For the air-conditioning heating medium, a liquid such as anti-rust-added water(water containing rust prevention material) is used. For the water pump 12, a variety of liquid pumps are employable. For the heater 14, an electric heater that is powered by a vehicle-mounted battery and generates heat is employed. The heater 14 heats the air-conditioning heating medium flowing in a path through heat transfer. The heater core 16 is a heat exchanger, where the air in the cabin flows outside the path in which the air-conditioning heating medium flows, and is heated through heat exchange so that the temperature increases. A blower 18 is provided to feed air from the cabin into the heater core 16. Note that the water pump 12 will be hereinafter referred to as an air-conditioning flow amount adjustment unit.

A channel extending from the heater 14 to the heater core 16 has a branch valve 44 inside. With the branch valve 44, some or the entirety of the air-conditioning heating medium flowing from the heater 14 can flow to the heat exchanger 30 while bypassing the heater core 16

The battery temperature adjustment circuit 20 is a circuit for circulating a battery heating medium. Specifically, the water pump (WP) 22 discharges the battery heating medium, which then passes through a battery 24 so that the battery 24 is heated through heat exchange and the temperature of the battery 24 is thereby increased. Note that the water pump 22 will be hereinafter referred to as a battery flow amount adjustment unit.

For the battery heating medium, a liquid such as water similar to the air-conditioning heating medium can be employed. For the water pump 22, a pump similar to the water pump 12 can be used.

For the battery 24, for example, a lithium ion battery is employed. Specifically, a predetermined number of serially connected battery cells ensures a predetermined voltage, and parallel connected battery cells ensure a predetermined battery capacity. The output of the battery 24 is normally 100V or larger, and is used as a power supply for a driving motor for a vehicle. Also, the output of the battery 24 is subjected to reduction in voltage by a DCDC converter before being used to charge an auxiliary battery. The heater 14 may receive power from the auxiliary battery or directly from the battery 24. A channel for the battery heating medium is formed in a case storing the battery 24. The battery 24 is heated through heat exchange in the channel so that the temperature of the battery 24 increases.

The heat exchanger 30 includes a channel for the air-conditioning heating medium and a channel for the battery heating medium, disposed adjacent to each other, so that heat is exchanged between these channels.

The battery 24 has a thermometer 32 to measure the temperature of the battery (the temperature of the battery cells). The temperature of the battery measured by the thermometer 32 is informed to a controller 40.

The controller 40 is informed of various information items, such as the temperature of the cabin, the state of a heat switch (a heating request), and a charge request for charging the battery 24, and controls, for example, driving of the water pumps 12, 22 or the like. Upon receipt of a charge request for charging the battery 24 when the battery 24 is at low temperature, the controller 40 controls the battery temperature adjustment circuit 20 to heat the battery 24 to increase the temperature of the battery 24. Meanwhile, upon receipt of a heating request, the controller 40 controls the air-conditioning circuit 10 to heat the cabin. Note that the battery temperature adjustment circuit 20 increases the temperature of the battery 24, using the heat from the heat exchanger 30, that is, the heater 14. Thus, in the case that increasing the temperature of the battery and heating the cabin are both requested at the same time, the heat from the heater 14 is used both in the air-conditioning circuit 10 and the battery temperature adjustment circuit 20. For this purpose, the controller 40 adjusts allocation of the heat from the heater 14.

System Control

Figure 2:
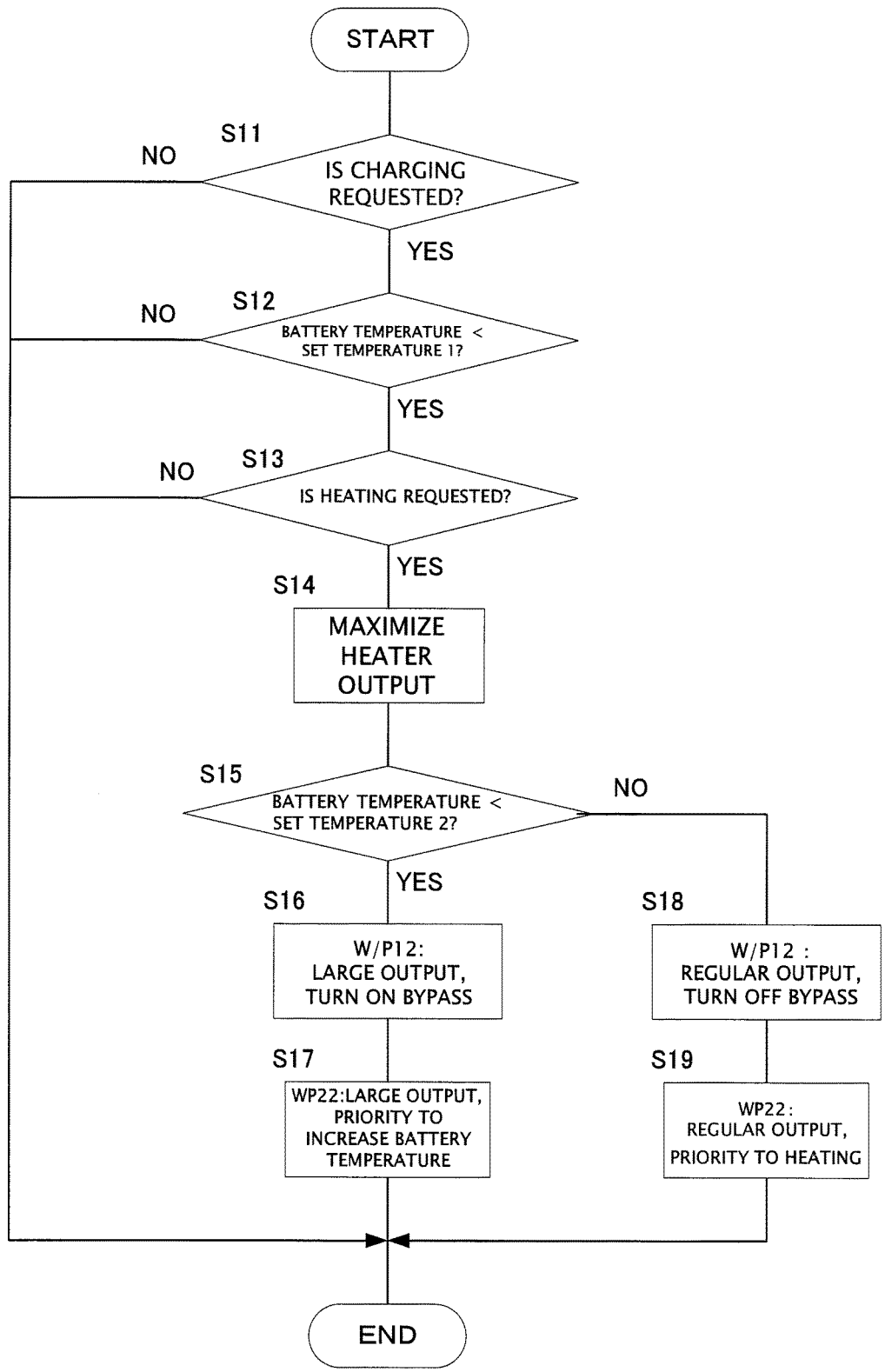
FIG. 2 is a flowchart of a process for controlling an air-conditioning circuit 10 and a battery temperature adjustment circuit 20.

FIG. 2 is a flowchart of a process for controlling the air-conditioning circuit 10 and the battery temperature adjustment circuit 20 by the controller 40.

Initially, whether a charge request, in particular, a fast charge request, has been made is determined (S11). This corresponds to a case, for example, in which the battery 24 of a parked vehicle is going to be charged with power from an outside fast charger. Cases of fast-charging may include a case in which a hybrid electric vehicle is charged with power generated by an engine or regenerative power regenerated through regenerative braking.

With NO to the determination in S11, a charging process is unnecessary, and the ongoing processing is terminated. With YES to the determination in S11, on the other hand, whether the temperature of the battery is lower than a set temperature 1 is determined (S12). Note that the set temperature 1 is a temperature to be referred to in determination as to whether increasing the temperature of the battery 24 is necessary, and is set to about 5 to 10° C., for example. In the case that the battery temperature is not lower than the set temperature 1, increasing the temperature of the battery is unnecessary, and the ongoing processing is terminated.

With YES to the determination in S12, whether a heating request has been made is determined (S13). With NO to the determination in S13, there is no need of allocation, and the ongoing processing is terminated. Note that the presence of a heating request may be determined based on whether a switch for heating the cabin has been turned on, as described above. With YES to the determination in S13, on the other hand, the output of the heater 14 is maximized (S14). Specifically, in the case that a request for increasing the temperature of the battery, or a battery temperature increase request, and a heating request have both been made, the heater 14 is set to generate a maximum amount of heat before allocation of the heat since a large amount of heat is needed.

Thereafter, whether the temperature of the battery is lower than a set temperature 2 is determined (S15). The set temperature 2 is set to, for example, about 0° C. This is because once the temperature of the battery drops to 0° C. or below, the battery charging characteristics are remarkably worsened, which increases the need to increase the temperature of the battery 24.

With YES to the determination in S15, the water pump 12 of the air-conditioning circuit 10 is set to output a large output, and the branch valve (a three-way valve) 44 is controlled to turn on the bypass, that is, such that the air-conditioning heating medium is branched into the bypass (S16). The amount of air-conditioning heating medium to be branched into the bypass may be determined in advance. For example, about 50% of the entire amount of air-conditioning heating medium may be branched into the bypass. Alternatively, the amount to be branched may be changed such that a larger amount is branched when the temperature of the battery is lower.

Further, the water pump 22 of the battery temperature adjustment circuit 20 is set to output a large output (S17).

As described above, with YES to the determination in S15, the output of the heater 14 is maximized to thereby maximize heating. Then, the amount of air-conditioning heating medium passing through the heat exchanger 30 of the air-conditioning circuit 10 is increased, and further the amount of battery heating medium passing through the heat exchanger 30 of the battery temperature adjustment circuit 20 is also increased. This can increase the amount of battery heating medium passing through the battery 24 and can increase the temperature of the battery heating medium. Hence, the battery 24 is heated more, which can hasten increase in temperature of the battery 24. Meanwhile, a reduced amount of air-conditioning heating medium passes through the heater core 16, which leads to insufficient heating of the cabin. That is, processing with priority to increase in the temperature of a battery is executed.

With NO to the determination in S15, on the other hand, the water pump 12 of the air-conditioning circuit 10 is set to output a regular output, and the branch valve 44 is set so as to turn off the bypass, that is, such that no air-conditioning heating medium flows into the bypass (S18). The water pump 22 of the battery temperature adjustment circuit 20 is set to output a regular output (S19).

As described above, with NO to the determination in S15, although the output of the heater 14 is maximized similar to the case with YES to the determination in S15, it is set such that a regular amount of air-conditioning heating medium passes through the heat exchanger 30 of the air-conditioning circuit 10 and the bypass of the air-conditioning circuit 10 is turned off so that the entire air-conditioning heading medium flows into the heater core 16. This increases the amount of air-conditioning heating medium passing through the heater core 16, which assures sufficient heating of the cabin. Note that the amount of air-conditioning heating medium passes through the heat exchanger 30 of the air-conditioning circuit 10 may be increased. Meanwhile, it is set such that a regular amount of battery heating medium passes through the heat exchanger 30 of the battery temperature adjustment circuit 20, so that a regular amount of battery heating medium passes through in the battery 24. Consequently, the heat exchanger 30 receives a lower amount of heat than that in the case with YES in S15. That is, increase of the temperature of the battery 24 is restricted to some extent.

As described above, with NO to the determination in S15, processing for heating the cabin is executed with priority over increase of the temperature of the battery 24.

Figure 3:
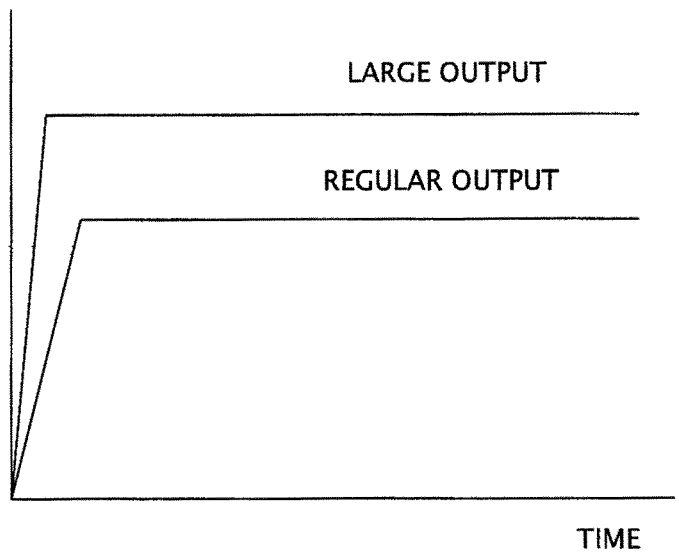
FIG. 3 is a graph showing change as time passes in duty ratio in respective cases where a water pump 22 outputs a large output and a regular output.

FIG. 3 illustrates change as time passes in duty ratio of power to be supplied to the water pump 22 in respective cases where the water pump 22 outputs a large output and a regular output. As illustrated, for a large output, a large duty ratio is set. In this case, the output increases quickly until the set duty ratio is reached. For a regular output, on the other hand, a relatively small duty ratio is set. Setting the duty ratio as described above enables setting of the amount of flow outputted from the water pump 22. Note that the amount of flow outputted from the water pump 12 can be controlled with a duty ratio, similar to the above.

The above-described embodiment is related to an increase in temperature of the battery 24 when fast-charging the battery 24. The capability of the battery cell becomes low when the battery is at low temperature, besides when the battery cell is being charged. To address the above, the above described processing may be applied when a request for increasing the temperature of the battery 24 is made with the battery 24 being at low temperature, and a request for heating is also made at the same time.

In the case of YES in S15, that is, in the case where increase of the temperature of the battery 24 is executed with priority, the blower 18 may be set so as to blow a lower amount of air so that the heat core 16 discharges a lower amount of heat, and a larger amount of heat can be used to increase the temperature of the battery 24.

In the case of NO in S15, that is, in the case where heating the cabin is executed with priority, the temperature of the cabin may be measured so that the amount of air to be blown by the blower 18 is automatically adjusted, depending on the difference between the measured temperature and a target temperature. That is, the blower 18 may blow a larger amount of air when the difference between the measured temperature and a target temperature is large so that the temperature of the cabin can become closer to the target temperature. When the difference relative to the target temperature is small, on the other hand, the amount of flow discharged from the water pump 12 may be automatically adjusted, depending on the difference relative to the target temperature. That is, the water pump 12 may be set so as to discharge a larger amount of flow when the difference relative to the target temperature is large.

REFERENCE SIGN LIST 1 temperature control system, 10 air-conditioning circuit, 12 water pump, 14 heater, 16 heater core, 18 blower, 20 battery temperature adjustment circuit, 22 water pump, 24 battery, 30 heat exchanger, 32 thermometer, 40 controller, 44 branch valve

The invention claimed is:

1. A temperature control system, comprising:
an air-conditioning circuit configured for circulating an air-conditioning heating medium and configured for adjusting a temperature of a cabin of a vehicle through heat exchange between the air-conditioning heating medium and air in the cabin;
a battery temperature adjustment circuit configured for circulating a battery heating medium and configured for adjusting a temperature of a battery through heat exchange between the battery heating medium and the battery;
a heat exchanger configured for exchanging heat between the air-conditioning heating medium and the battery heating medium;
a thermometer configured for measuring the temperature of the battery; and
a control unit configured for controlling the air-conditioning circuit and the battery temperature adjustment circuit,
wherein
the air-conditioning circuit includes
a heater configured for heating the air-conditioning heating medium,
a heater core configured for performing the heat exchange between the air-conditioning heating medium and the air in the cabin, and
a first water pump configured for adjusting an amount of flow of the air-conditioning heating medium and configured for outputting a first amount of flow of the air-conditioning heating medium and a second amount of flow of the air-conditioning heating medium, the second amount of flow of the air-conditioning heating medium being larger than the first amount of flow of the air-conditioning heating medium,
the battery temperature adjustment circuit includes a second water pump configured for adjusting an amount of flow of the battery heating medium and configured for outputting a first amount of flow of the battery heating medium and a second amount of flow of the battery heating medium, the second amount of flow of the battery heating medium being larger than the first amount of flow of the battery heating medium, the control unit is configured to variably control an amount of flow of at least one of the air-conditioning heating medium or the battery heating medium, depending on a request for increasing the temperature of the battery, a request for heating the cabin of the vehicle, and the temperature of the battery, and the control unit is configured to, in response to (i) receiving the request for increasing the temperature of the battery, (ii) receiving the request for heating the cabin, (iii) an output of the heater being maximized, and (iv) the temperature of the battery being lower than a set temperature, set the first water pump to output the second amount of flow of the air-conditioning heating medium, set the second water pump to output the second amount of flow of the battery heating medium, and turn on a bypass route in which the air-conditioning heating medium flows from the heater to the heat exchanger while bypassing the heater core, to increase the amount of flow of the air-conditioning heating medium to the heat exchanger while reducing the amount of flow of the air-conditioning heating medium to the heater core.

2. The temperature control system according to claim 1, wherein the control unit is configured to, in response to (i) receiving the request for increasing the temperature of the battery, (ii) receiving the request for heating the cabin of the vehicle, (iii) the output of the heater being maximized, and (v) the temperature of the battery being not lower than the set temperature, set the first water pump to output the first amount of flow of the air-conditioning heating medium, set the second water pump to output the first amount of flow of the battery heating medium, and turn off the bypass route to cause an entirety of the amount of flow of the air-conditioning heating medium to flow to the heater core.

3. The temperature control system according to claim 2, wherein the request for increasing the temperature of the battery is a request that is made to fast-charge the battery.

4. The temperature control system according to claim 2, further comprising a branch valve in a channel extending from the heater to the heater core, wherein the control unit is configured to control the branch value to turn on or off the bypass route.

5. The temperature control system according to claim 4, wherein the control unit is configured to, in response to receiving the request for heating the cabin of the vehicle, determine whether the temperature of the battery is lower than a further set temperature, the further set temperature being higher than the set temperature.

6. The temperature control system according to claim 5, wherein the control unit is configured to, in response to determining that the temperature of the battery is lower than the further set temperature, determine whether the request for heating the cabin of the vehicle is received.

7. The temperature control system according to claim 6, wherein the control unit is configured to, in response to receiving the request for heating the cabin of the vehicle, maximize the output of the heater.

8. The temperature control system according to claim 7, wherein the control unit is configured to, in response to the output of the heater being maximized, determine whether the temperature of the battery is lower than the set temperature.

9. The temperature control system according to claim 1, wherein the request for increasing the temperature of the battery is a request that is made to fast-charge the battery.

* * * * *